Patented Mar. 21, 1933

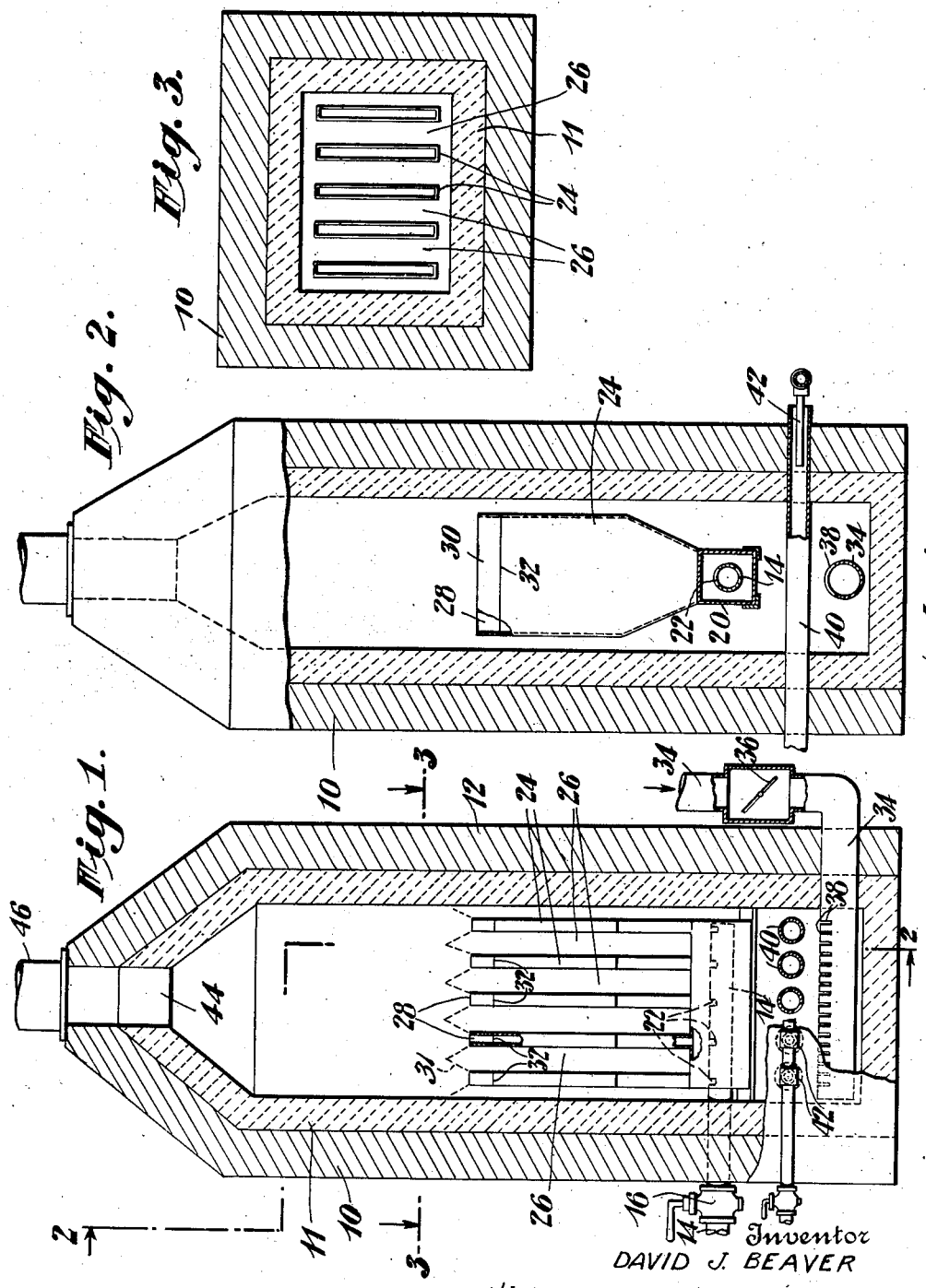

1,902,753

UNITED STATES PATENT OFFICE

DAVID J. BEAVER, OF ELIZABETH, NEW JERSEY, ASSIGNOR TO GENERAL ATLAS CARBON COMPANY, OF DOVER, DELAWARE, A CORPORATION OF DELAWARE

METHOD OF AND APPARATUS FOR PRODUCING CARBON BLACK

Continuation of application Serial No. 219,152, filed September 12, 1927. This application filed January 27, 1931. Serial No. 511,640.

The present invention relates to the art of producing carbon black; and this application is a continuation of applicant's copending application, Serial No. 219,152, filed Sept. 12, 1927, relating to "method of and apparatus for producing carbon black".

In the present industrial production of carbon black from hydrocarbons, two methods are in large scale use; namely, incomplete combustion and thermal decomposition. The first method is so well known that is needs no description. The second method comprises cracking a hydrocarbon to carbon black by passing the hydrocarbon through hot checker work or hot retorts or the like. In the first method, although the carbon black obtained is of good color value and of excellent physical properties, the yield is very low, amounting in commercial plants known to us to about 3½% of the carbon present in the natural gas. In the second method, the yields are very much higher and may be as much as 25%, but the color value of the black is only about 15% of that produced by incomplete combustion and the other physical properties of thermally produced black are unsatisfactory from the standpoint of many of its most important uses. It has been considered by many authorities that the undesirable properties of the carbon black produced by thermal decomposition are due to the high temperature at which the decomposition of the gas is carried out. However, experiments carried out here have shown very conclusively that this poor color is due to cracking in contact with hot surfaces (either liquid or solid) and not to the high temperature. For example, when natural gas is cracked in contact with nickel as a catalyst at temperatures of 500° or 900° C., the black has the same color, namely 15% of standard, in both cases. It is evident from the results of said experiments that, in order to produce a black with satisfactory properties, the decomposition of the hydrocarbon must take place out of contact with any solid or liquid surface.

The present invention consists in the combination of steps in the production of carbon black by partial combustion or by decomposition of the gas by contact with a hot gas and in the arrangement and combination of parts for producing carbon black by partial combustion or hot gas decomposition as hereinafter described and particularly pointed out in the claims.

The present invention is based on the results of extensive experiments carried out to find the optimum conditions for maximum production of carbon of satisfactory physical properties by partial combustion of hydrocarbon or by hot gas decomposition thereof, but more particularly by partial combustion of the hydrocarbon.

By suitable design of apparatus and careful adjustment and control of operating conditions it is possible to produce by the incomplete combustion of natural gas or other hydrocarbon or hydrocarbon containing gas, yields and efficiencies higher even than those obtained by the so-called thermal decomposition processes.

In the drawing forming part of this specification, I have illustrated specific form of apparatus adapted for carrying out the preferred method of the present invention.

Fig. 1 is an elevation of a carbon black furnace parts being shown in section and parts being broken away for purposes of illustration.

Fig. 2 is a section of the furnace taken on the line 2—2 of Fig. 1 looking in the direction of the arrows, parts being broken away for purposes of illustration.

Fig. 3 is a section of the furnace taken on the line 3—3 of Fig. 1 looking in the direction of the arrows.

Referring to the drawing, 10 is a furnace preferably provided with inner refractory lining 11 and an insulating wall 12 for preventing loss of heat from the furnace, thus rendering it free from atmospheric disturbance. Gas is introduced into the furnace 10 through a pipe 14. In general, gas in the pipe 14 will be under pressure and it is preferred to regulate the flow of gas to the combustion chamber at a point prior to its admission thereto. For this purpose, a valve 16 is illustrated in the pipe 14 outside of the furnace 10. A flow meter (not shown) may be connected into pipe 14 to assist the operatives in maintaining the desired ratio of gas and air. Pipe 14 extends through the wall of the furnace 10 and into the lower part of the furnace. Within the furnace pipe 14 is enclosed for most of its length in a horizontal duct 20, duct 20 extending almost the entire length of the furnace in the direction of the pipe 14. The duct 20 forms a part of the gas burner apparatus according to the present invention and may be conveniently made in the form of a rectangular box as illustrated in Fig. 2. Within the conduit 20, pipe 14 is notched or slotted as indicated at 22 to permit gas to pass from pipe 14 into the interior of conduit 20. Slots 22 are distributed evenly or uniformly along the upper side of pipe 14, so that gas may be supplied to the duct 20 uniformly throughout its length. According to the present invention part of the gas introduced through the pipe 14 is burned to provide the heat that is used for decomposing the remainder of the gas to form carbon black. To accomplish this, the narrow, parallel gas ducts 24, 24 extend from the top of conduit 20 up into the furnace chamber. Ducts 24 are broadened or flattened out above and adjacent the conduit 20 so that as illustrated in Figs. 2 and 3 their width is almost equal to that of the furnace 10, the space between adjacent gas ducts 24 and that between the edges of ducts 24 and the wall 11 serving as air ducts 26, 26 surrounding the gas ducts 24 and distributing air for combustion equally thereto. It will be seen that the air streams and gas streams are thus given a parallel or stream line flow before they come into contact.

The gas ducts 24 extend upwardly within the furnace chamber, having mouths 28 through which the gas discharges upwardly in the form of thin sheets. It will be understood that when the apparatus is in operation flame sheets extend upwardly from the mouths 28. The flame fronts in which complete combustion to $CO_2$ and $H_2O$ occurs occupy the positions indicated by dotted lines in Fig. 1. It will be seen that the flame fronts from adjacent burners eventually intersect or impinge at their upper ends, whereby passage of uncombined oxygen beyond the flame fronts is prevented. Burning of free carbon particles by free oxygen is thereby minimized or prevented. In the arrangement illustrated all of the ducts 24 have the same form and size. It has been found that the ends of the ducts 24 adjacent the mouths become quite hot and that ordinary sheet steel deteriorates very rapidly at these points. Burner tips 30, 30 of chrome-iron or like high temperature alloy may be used at the ends of the ducts 24 in contact with the flames which are durable under the conditions encountered in practice. Alloy tips 30 may be secured to the bodies of the ducts 24 by any suitable means, but it has been found preferable to attach the tips to the ducts by suitable sockets as indicated by the lines 32—32 in Figs. 1 and 2.

An important feature of the invention consists in the control of partial combustion of the gas used in making carbon black so that a uniform thin flame front is formed and maintained around the hydrocarbon gas moving in stream line non-turbulent flow, to supply the heat for decomposing the hydrocarbon within the flame front as the gas diffuses from the center of the gas stream out to the flame front during such stream line movement of the flowing contiguous gas and air streams. In order to secure the highest practicable yield of carbon black from the gas the invention also consists in providing the longest practicable flame periphery for a predetermined cross section area of the gas stream, in order to give the maximum useful energy available for decomposing the gas with radiant heat energy which is radiated from one side of the flame front to the other. Accordingly, the gas is introduced into the furnace in spaced sheets through burner ducts which are very wide and relatively thin. The said width of the gas duct has little or no effect on the yield or character of the gas black made, but the thickness of the gas duct has to be accurately controlled in order to provide the proper character of the flame front so as to produce as small amounts as possible of carbon monoxide and hydrogen. The gas ducts are so arranged that as the gas diffuses into the air moving along in contact with it, a flame front will be formed at the points of contact of the gas and air streams or sheets, along which flame front the gas eventually will be substantially completely burned. In the case of methane and air the products of combustion will be carbon dioxide and water vapor. If the gas ducts are too thin, an ideal flame front cannot be developed and comparatively high percentages of hydrogen and carbon monoxide will be formed on the inside of the flame front and thus the yield of carbon black will be cut down. The hot gas in the flame front has a comparatively high viscosity, and the carbon formed by the heat of the flame front on the inside thereof by the decomposition of the gas is substantially all held against the inner face of the viscous flame front or gaseous sheath and passes upwardly through the furnace chamber in a definite or non-turbulent flow of streamline character. This carbon stream does not readily pass or diffuse through the viscous gas flame front to come into contact with the oxygen due to the maintenance of the said streamline flow, which is facilitated by the high temperature of the furnace interior and the respective rates of flow of the gas and air sheets or streams, and therefore a comparatively small amount of the carbon is oxidized to form carbon oxides.

Preferably the gas ducts should not be less than 3/8 of an inch in thickness and the optimum results are obtained with a gas duct of about one-half inch thickness. The yields and properties or characteristics of the gas black are not affected by increasing the thickness of the duct to one inch or more, provided the height of the combustion chamber and the other fact as mentioned below are adjusted for optimum results. However, where gas ducts are made thicker there is a greater tendency for the formation of carbon on the outlets of the duct tips and this carbon formation seriously interferes with the process and the character of the black being manufactured.

Experiments have shown also that the relative thickness of the air duct to the gas duct is an important factor in determining the yields and properties of the carbon black produced. For example, when using natural gas, it has been found that the best yield and properties of black are obtained when the air duct is 3½ times as thick as the gas duct. The minimum thickness of air duct according to the present invention should not be less than 2½ times the thickness of the gas duct. It was found that when the ratio of the thicknesses of the air to gas ducts was decreased to 2 the yield was only ⅓ of that when this ratio is 3½, and further the lower ratio relation produces large amounts of intermediate decomposition products. It has been found that the optimum ratio of the thicknesses of air to gas ducts increases as the percentage of combustion of the hydrocarbon increases. The optimum ratio of 3½ between the thickness of air duct to gas duct was determined when burning approximately 65% of the methane or natural gas. The optimum ratio of thickness of air duct to gas duct is, however, affected by the hydrocarbon being burned as well as by the percentage of combustion of the hydrocarbon. When using pure ethane in place of natural gas, it was found that the thickness of the air duct for optimum production of black was about six times the thickness of the gas duct instead of 3½ as with natural gas. When using ordinary natural gas of a heating value of between 1000 and 1200 B. t. u., per cubic foot, the maximum desirable ratio of air duct area to gas duct area is 7. For pure ethane having a heating value of about 1790 B. t. u., per cubic foot, the maximum desirable ratio of the area of air duct to gas duct is between 9½ and 10.

When the air contains enough oxygen for the complete combustion of only 60% of ordinary natural gas the preferred areas of gas ducts and air ducts produce relative velocities of gas to air in the ratio of 1 to 1.2. At the same per cent of combustion this ratio should not be permitted to fall below that of 1 to 2.2 or to rise above 1 to 0.67, while relative velocities of the air and gas streams giving velocity ratios of between 2. and 0.9 are more suitable, since relative velocities of gas and air outside of this range of ratios tend to produce turbulence in the fluid streams, which in turn materially reduces the yield of carbon black and renders the same variable.

Experiments have shown also that the yield and properties of carbon black formed are influenced by the ratio of the flame front periphery to area of gas duct. Under the best conditions of operation it has been found that the ratio of the periphery of the flame taken transversely at or adjacent the gas duct outlet to the area of the gas stream or duct at such point lies between 2.0 and 4.5. The preferred ratio is about 4.0. This ratio, however, should not fall below 1½ according to the present invention, and preferably should not be increased above 5.

The air for supporting combustion may be introduced into the ducts 26 in any convenient manner within the present invention. In the arrangement illustrated, air is introduced into the furnace 10 below the level of pipe 14. For this purpose a pipe 34 is passed through the wall of the furnace 10 near its bottom, pipe 34 being illustrated as having a damper 36 therein to regulate the flow of air. A flow meter (not shown) may be connected into pipe 34 to assist the operatives in maintaining the desired flow of air. Pipe 34 preferably extends across the furnace chamber below the pipe 14 and is slotted or notched as indicated at 38, 38 to discharge air uniformly along its upper face. If desired, the air from pipe 34 may be preheated before being used to support combustion in the furnace 10 and for this purpose I have illustrated a series of heating tubes 40, 40 extending horizontally through two opposite sides of furnace 10 and conveniently arranged to run in vertical planes at right angles to the plane of pipes 14 and 34. Pipes 40 lie above pipe 34 and may be heated by any convenient means so as to heat the air from pipe 34 as it rises around them. In the arrangement illustrated, gas burners 42, 42 are arranged, one in each of pipes 40 for heating them internally. The air introduced into the furnace chamber 10 may be initially under pressure or it may be drawn through the apparatus by induced draft. In either case, the ratio of gas to air is regulated by the valve 16 and the damper 36 as desired.

Experiments have shown that increasing the ratio of air to gas improves the color value of the black to an optimum and then may decrease it again slightly. The optimum results as to color value and properties of the black are obtained when the ratio of air to gas is that required for theoretically complete combustion of approximately 65% of the hydrocarbon and properties of the black are almost the same at rates of air based on theoretically complete combustion of between 60 and 65% of the hydrocarbon used. With this per cent of combustion the optimum thickness of air duct is, for methane or ordinary natural gas, about 3½ times that of the gas duct as pointed out previously.

When the combustion chamber is properly insulated against heat loss, the yield of carbon black is practically constant between 45% and 75% combustion of the hydrocarbon used, although the yield or properties may be slightly adversely affected at either extreme of this range. The yield of carbon black is considerably decreased when these limits are exceeded in either direction. It is evident, therefore, that the maximum yield of the best grade of black is obtained when operating at rates of combustion between 60 and 65%. However, decreasing the ratio of air to gas increases the B. t. u., per unit of flue gas leaving the furnace chamber and therefore increases its value as fuel. Under certain conditions, it is therefore desirable to sacrifice some values of the carbon black in order to increase the value of the flue gas.

The yield of carbon black from a given amount of hydrocarbon increases as the temperature of the combustion chamber increases up to the maximum temperatures investigated. However, some of the physical properties of the black may be somewhat poorer if the temperature is too high, the best operating temperature being in the neighborhood of 1300–1400° C. The temperature of the reaction chamber just referred to is determined by means of thermocouples placed flush with the inside of the wall of the furnace. However, the temperature observed at this point is not the only criterion of the effective decomposition energy available for the production of carbon from hydrocarbons. As is well known the actual flame temperature of a hydrocarbon, such as methane, burned in air is over 1800° C., and, therefore, the percentage of radiant energy from such a flame is very high. If flames of this character are surrounded by relatively cold walls (1300 to 1400° C.) this radiant energy would be absorbed very rapidly by the walls and the average temperature of the flame will be equal to its surroundings. It is possible to utilize this radiant energy effectively by so arranging the burners that the largest possible surface of any flame radiates to another flame and not to a wall. In other words, it appears from numerous experiments on single versus multiple burner furnaces, that the formation of carbon black within the flame is activated by direct radiation from other flames. Solid surfaces intervening between the flames or reflecting to one flame the radiation from another, appear to absorb this activating radiation. In the arrangement illustrated, this result is accomplished by means of a multiple burner unit, the gas ducts having the burner tips 30 therein extending parallel and being relatively much wider than they are thick so that the greater portion of the flame from any one burner tip faces another flame. It is preferred that the gas ducts or burners be at least five times as wide as thick and a ratio of 15 to 1 has been most commonly used. As an example of the magnitude of the effect of the radiant energy on the production of carbon black, the following examples are given:

With a single rectangular burner having proportions approximately the same as one of those illustrated in the drawing, the yield of carbon obtained was 17% of the available carbon in the hydrocarbon gas when the temperature of the reaction chamber was 1150° C., measured at the furnace wall. With a 5 burner furnace, the yield of carbon was 24% of the available carbon in the hydrocarbon gas, the temperature and other conditions being approximately the same. In another experiment on a multiple burner furnace in which each burner was surrounded by a thin wall silica tube, the removal of the silica tubes caused the yield to rise from 19.5 to 21% although all temperature and other operating conditions were absolutely constant. It is evident from the examples just given that the factor of radiation is highly important for the production of the highest yield of carbon black, and it is preferred that the radiation from flame to flame be at least five times that from the flames to the walls of the furnace and a ratio as high as permissible by the given type of burners used is desirable.

The gases of combustion containing the carbon black formed in the furnace chamber pass out therefrom at the top through the opening 44 and stack 46. The stack structure ordinarily is such that the gases begin to cool rapidly as soon as they leave the furnace chamber. The carbon black formed, therefore, is in contact with highly heated products of combustion while passing from burner tips 30 to the stack 46. Experiments have shown that the time of contact between the carbon formed by the decomposition of the hydrocarbon and the hot gases influences the yield very largely. The effect of the time of contact will be apparent from the following example:

In a series of runs using natural gas the velocity of the gases through the furnace was maintained such that the carbon black was in contact with the hot gases for a period of two seconds. In this run the yield of carbon black was 26% of the theoretical. In a second series of runs the velocity of flow of the gases was increased so that the time of contact between the carbon black and the hot gases in the furnace was decreased to one second, the yield of carbon black being thereby increased to 33% of the theoretical. This decrease in yield with increased time of contact is due presumably to the reaction of the carbon with the carbon dioxide and the water vapor in the gaseous products of combustion. However, it was found that the time of contact cannot be decreased beyond a certain amount since it is essential to prevent decomposition of any appreciable amount of hydrocarbon by impinging on the hot walls of the reaction chamber. As above mentioned, carbon formed in contact with the hot walls is of a very poor grade and therefore contaminates and lowers the grade of the carbon formed within the gas when the two are mixed together. Therefore, the optimum conditions for operation is one in which the time of contact is reduced to a minimum consistent with production of carbon black entirely within the gas stream without decomposition of any hydrocarbon on the walls of the furnace. In operating a furnace, the top of which was 36 inches above the burner tips, it was found that due to the maintenance of streamline conditions of fluid flow within the same, the minimum time of contact that could be used and still obtain a good grade of carbon black was about one second when burning natural gas at 60–65% combustion with the optimum thickness of gas and air ducts. However, this time can be decreased somewhat by increasing the per cent of combustion because under these conditions the flame is shorter than at the lower per cent of combustion. In extended large scale tests, under proper conditions, the time of contact was reduced to $\frac{1}{2}$ second while still obtaining a good quality of black. Therefore, the optimum rate of absolute velocity of flow of gas and air is controlled largely by the height of the furnace since this height determines the time of contact when using a given type of burner. However, as above mentioned, the higher the temperature of the reaction chamber, the higher the loss of carbon. In other words, the yield obtained with a contact of one second between hot gases and carbon black is dependent on the temperature of the reaction chamber. As was pointed out above, increased temperature of the reaction chamber increases the yield of black and it also increases the loss of black by reaction with the flue gas. In order, therefore, to obtain maximum yields it has been found desirable to make the time contact as short as possible and the temperature as high as is consistent with the type of apparatus used.

As the reaction between the carbon black and the hot furnace gases is relatively slow as compared to the speed of the initial formation of the black, the time of contact between the carbon black and the hot gases within the furnace chamber may be extended materially above one second. A contact period of three seconds is the greatest length of time which appears to give good results.

The construction and method of operation of the apparatus previously described will be evident to those skilled in the art from the foregoing description. For purposes of convenience, however, the apparatus and its method of operation according to the present invention may be briefly described as follows:

The apparatus consists essentially of a "furnace" or "reaction chamber", preferably arranged vertically and surrounded with suitable heat insulating material to prevent heat losses. The furnace chamber is in general, lined with suitable refractory material and contains in its lower section a suitable arrangement of gas supply ducts, air supply ducts and burners, the shape and dimensions of the furnace, gas and air ducts, and burners, being governed by the conditions set forth below. Each furnace contains a plurality of burners and preferably a considerable number so arranged that the flames radiate mainly to each other, which in conjunction with the fact that the whole furnace is insulated from heat loss, produces high temperatures within the flames and promotes the interchange from flame to flame of those active radiations which promote the decomposition of the carbon-containing or hydrocarbon gas to form carbon black. These burners may be rectangular in cross-section and arranged in parallel rows as illustrated, but various shapes and arrangements of the burners may be used within the present invention. Whatever the size and shape of the individual burners, they must be so arranged that the ratio of total transverse cross-sectional perimeter (flame front) adjacent the burner outlet to total cross-sectional area (gas duct area) at this point lies between $1\frac{1}{2}$ and 5 and preferably between 2.0 and 4.5. The spacing of the burners, or in other words, the area of the air duct between them, must be such that the ratio of air duct area to gas duct area lies between $2\frac{1}{2}$ and 7 while using ordinary natural gas, of a heating value of from 1000 to 1200 B. t. u. per cubic foot. The preferred ratio of air duct area to gas duct area for ordinary natural gas is aproximately 3.5. If a carbon-containing gas of higher or lower heating value is used, the ratio of air duct area to gas duct area should be changed correspondingly to the increased or decreased amount of air required to obtain the same percentage of total combustion of the gas, or, in other words, so as to maintain the same ratio of the linear velocities of air and gas as is given by an air duct/gas duct area ratio of between 2½ and 7 in the case of natural gas of the heating value above stated. Decreasing this area ratio materially, soon adversely affects the yields and properties of the product. Higher ratios (lower relative air velocities) can be used without materially adverse effects so far as the method and product is concerned but it is disadvantageous to use such high ratios in practice since they increase the size of the furnace per unit of production capacity. The optimum air duct/gas duct area ratio is further conditional in some degree on the use of the preferred air supply of 60–65% of that needed for the total combustion of the gas. It is not necessary to restrict the air supply to narrow limits, however, since an air supply within the range of 40–75% of that needed for total combustion of the gas gives yields which are a great improvement over present operation practice. If air be supplied in other than the preferred amount stated (60–65% of that required for total combustion) the air duct/gas duct area ratio should preferably be changed in the same proportion so as to maintain the same ratio of linear velocities of air and gas. The size and shape of the "furnace" or "reaction chamber" should be such that the time of contact of the furnace gases in the hot zone of the furnace is within the limits 0.5–3.0 seconds, the preferred limits being, however, 0.5–1.0 second. At lower times of contact than 0.5 second, the properties of the product are adversely affected while for times of contact of over 1.0 second, the yield of product tends with the hot furnace gases after its initial formation in the flames, this reaction being however, relatively slow as compared to the speed of its initial formation. The hot zone of the furnace in which reaction occurs between the highly heated gases and the carbon black is herein understood to comprise the volume of the furnace between the level of the burner tips and the furnace offtake where the cooling of the gases first becomes rapid.

While I have described herein a given form of apparatus and a given method of operation, it will be understood that I do not limit myself to details of the foregoing description, the invention being limited and defined solely by the terms of the appended claims. In particular, it will be understood that we prefer not to collect the carbon black on cold surfaces, or otherwise to cool the furnace chamber, and that circular burners and air ducts may be used instead of rectangular ones.

In the specification and claims the values given for the relationship between the perimeter of the ducts or flame fronts and the cross-sectional areas of the ducts or flame fronts are those which obtain when using corresponding units of measurement. For example, if the perimeter is expressed in inches,—the cross-sectional area is expressed in square inches.

Having thus described my invention I claim:

1. Apparatus for the production of carbon black, comprising a furnace chamber having an unobstructed upper interior portion, a plurality of uniformly-spaced, narrow gas ducts mounted in the lower portion of the chamber with their longer sides arranged in parallel, and air ducts surrounding each of the gas ducts and wider than the latter, the said arrangement of the air and gas ducts within the furnace chamber thereby providing for the radiation directly from each flame to the others of a greater proportion of radiant energy, during the combustion of gas in the chamber than is radiated from such flame directly to the walls of the chamber.

2. Apparatus for the production of carbon black, comprising a heat-insulated furnace chamber having its interior free from collecting surfaces interfering with the free flow of fluids therethrough, a plurality of spaced, flattened burners disposed within said chamber with their longer sides respectively parallel, and means for introducing air into the said chamber around each of the burners, the said means providing a total transverse cross-sectional area available for air flow greater than that of the total transverse cross-sectional area of the said plurality of burners, the said arrangement of the burners providing for the radiation directly from one flame to adjacent flames of a much greater proportion of its radiant energy than is radiated directly from such flame to the walls of the furnace chamber.

3. Apparatus for the production of carbon black comprising, an insulated furnace chamber, a plurality of thin gas ducts disposed in parallel in the lower portion of the chamber and accurately spaced to provide therebetween a plurality of air ducts, each of the latter being substantially wider than the intermediate gas duct, the total transverse area of the air ducts bearing a preselected proportional relation greater than unity to the total transverse area of the said gas ducts at their outlet ends, means for introducing air into the lower portion of the furnace chamber, means for distributing the air uniformly within the said air ducts and between the gas ducts, and means for controlling the proportion of air to gas introduced into the furnace.

4. Apparatus for the production of carbon black, comprising a furnace chamber containing in its lower portion a plurality of flattened burners disposed adjacent each other with their flattened sides arranged substantially in parallel planes and extending substantially the entire width of the furnace chamber, each of the said burners having a mouth of between ⅜" and 1" in thickness, means for flowing air upwardly through the furnace and around each of the said spaced burners, the ratio of the spacing between adjacent burners to the thickness of each burner mouth being within the range of from 2.5:1 to 7:1.

5. Apparatus for the production of carbon black, comprising a furnace chamber, a plurality of spaced flattened burners arranged in the said furnace adjacent each other with the longer sides thereof parallel, each of the said burners having at its outlet end a transverse cross-sectional perimeter between 2 and 4.5 times its cross-sectional area at the said outlet end, and flattened air ducts interposed between the respective gas ducts and surrounding each thereof, the total transverse cross-sectional area of the air ducts being greater than the total transverse area of the burners.

6. An apparatus for the production of carbon black from hydrocarbon by partial combustion, comprising a furnace chamber, a plurality of parallel relatively narrow gas burners in said chamber and wider but elongated air ducts surrounding said burners and distributing air equally thereto.

7. An apparatus for the production of carbon black from hydrocarbon by partial combustion, comprising a furnace chamber, and a plurality of parallel burners positioned within said chamber in uniformly spaced relation, the ratio of the total cross-sectional perimeter of said burners at their outlet end to their total inner cross-sectional area adjacent the said ends lying between 1½ and 5, means for flowing air through the chamber and around each of the said spaced burners, the spacing between adjacent burners bearing a ratio to the inner thickness of the individual burner duct of from 2.5:1 to 7:1.

8. In the process of producing carbon black by the partial oxidation of hydrocarbons in an unobstructed, enclosed space, the improvement comprising flowing a plurality of flattened alternate streams of air and hydrocarbon gas preterminated velocities in the same direction through the said space, burning the said gases with between 40% and 75% of the theoretical amounts of air required for the complete combustion of the said gas, and maintaining the relative velocities of the respective gas and air streams within the ratios of 1:2.2 and 1:.67.

9. In the process of producing carbon black by the partial oxidation of hydrocarbons in an unobstructed, enclosed chamber, the improvement comprising flowing alternate streams of air and hydrocarbon gas at predetermined velocities in the same direction through the chamber, burning the said gases with between 40% and 75% of the theoretical amounts of air required for the complete combustion of the gas, and maintaining the relative velocities of the respective gas and air streams within the ratios of 1:2 and 1:.9.

10. In the process of producing carbon black by the partial oxidation of hydrocarbons in a heated, enclosed chamber, the improvement comprising flowing a plurality of alternate streams of air and hydrocarbon gas at predetermined velocities in the same direction through the chamber, burning the said gas with between 40% and 75% of the theoretical amounts of air required for the complete combustion of the gas, and maintaining the relative velocities of the respective gas and air streams approximately in the ratio of 1:1.2.

11. In the art of producing carbon black by the partial oxidation of contiguous flowing streams of hydrocarbons and air in a heated, enclosed chamber, the improvement comprising burning the said hydrocarbons with between 40% and 75% of the theoretical amount of air required for the complete combustion of the hydrocarbon.

12. In the art of producing carbon black by partial combustion of contiguous flowing streams of hydrocarbons and air in a heated, enclosed chamber, the improvement comprising burning the said hydrocarbon with between 60% and 65% of the theoretical amount of air required for the complete combustion of the hydrocarbons.

13. In the art of forming carbon black by decomposition of hydrocarbon in the gaseous phase and in the absence of cooling plates the improvement comprising limiting the time of contact of carbon formed from the hydrocarbon with highly heated gases of combustion to between ½ and 3 seconds, while out of contact with solid cooling surfaces, and thereafter rapidly cooling the gaseous reaction products containing the carbon black.

14. In the art of forming carbon black by partial combustion and in the absence of cooling plates, the improvement comprising limiting the time of contact of carbon formed from hydrocarbon with highly heated gases of combustion to not more than one second while out of contact with solid cooling surfaces and thereafter rapidly cooling the gaseous reaction products containing the carbon black.

15. The method of making carbon black comprising flowing into a heated, enclosed space, a plurality of narrow streams containing a gaseous hydrocarbon, each of the said streams having its transverse major axis parallel to adjacent streams at its point of entry into the enclosed space, burning the respective streams of hydrocarbon in a surrounding atmosphere of air, the latter being present in amounts insufficient to permit the complete combustion of the hydrocarbon, directly radiating the major portion of the radiant energy from each of the resultant flames to adjacent flames, thereby decomposing the unburned portion of said hydrocarbons to produce carbon black substantially out of contact with solid or liquid surfaces.

16. The method of making carbon black comprising burning hydrocarbon in a plurality of flames of determinate shape with a supply of oxygen sufficient for the complete combustion of a portion only of said hydrocarbon and maintaining the shape and location of each of the said flames so that each flame presents the maximum amount of radiating surface to the other flames that is possible from flames of such shape.

17. A method of producing carbon black by partial combustion of hydrocarbon, comprising decomposing a portion of the gas to form carbon black while the gas is flowing in a plurality of spaced thin flat streams each surrounded by a flame front in which complete combustion of another portion of the gas occurs, maintaining the combustion within an insulated chamber to conserve the heat and to radiate heat from one flame front and the walls to another, and preventing the diffusion of the carbon black through the viscous flame fronts until the gases of combustion have passed into a zone sufficiently cool to retard the combustion of the carbon.

18. An apparatus for the production of carbon black by partial combustion of hydrocarbon comprising a furnace having a plurality of relatively narrow burners therein, and arranged with their major axes parallel, the outlet end of each burner having an effective thickness of between 3/8 to 1 inch and having inside transverse cross-sectional perimeters adjacent their outlet ends between 2.0 and 4.5 times their cross-sectional areas at the said ends.

19. In the art of forming carbon black by a partial combustion of hydrocarbon, the improvement comprising burning hydrocarbon of from 1000 to 1790 B. t. u. per cu. ft. in a heated, enclosed space in a gas stream by oxygen in an air stream flowing in contact therewith while limiting the combustion to between 40% and 75% of the hydrocarbon and making the area of the air stream as it enters the enclosed space from two and one half to ten times the area of the gas stream.

20. In the art of forming carbon black, the improvement comprising burning hydrocarbon of from 1000 to 1200 B. t. u. per cubic foot in a heated, enclosed space in a gas stream by oxygen in an air stream flowing in contact therewith while limiting the combustion to between 60% and 70% of the hydrocarbon and making the area of the air stream adjacent the point of entry of the gas stream into the enclosed space from three to four times that of the gas stream as it enters the enclosed space, and maintaining heat insulating conditions in the zone of combustion.

21. In the art of making carbon black by the partial combustion of hydrocarbon, the improvement comprising burning hydrocarbon of from 1000 to 1200 B. t. u. per cubic foot in a plurality of relatively narrow flames each arranged to radiate a major proportion of their radiant energy directly to others of the flames, supplying air uniformly to said flames, and limiting the combustion to between 60% and 70% of the hydrocarbon.

22. In the improvement set out in claim 21, maintaining heat insulating conditions in the zone of combustion.

23. In the art of making carbon black by the partial combustion of hydrocarbon, the improvement comprising burning hydrocarbon in a plurality of flames each elongated in one transverse direction, said flames having their major transverse axes parallel, supplying air to said flames sufficient for the complete combustion of between only 45% and 75% of said hydrocarbon and under conditions to cause a steady upward flow within the flames of a highly viscous gas envelope containing carbon black.

24. The process of producing carbon black which comprises, burning a plurality of spaced, parallel, flattened streams of gaseous hydrocarbon in a heat-insulated, enclosed space with an amount of air theoretically insufficient to support complete combustion of more than 70% of the hydrocarbon, each of the said streams of hydrocarbon having, at its point of entrance into the said enclosed space, a transverse cross-sectional shape providing a stream approaching the maximum periphery for a stream of given transverse cross-section.

25. An apparatus for making carbon black by partial combustion of hydrocarbons; comprising a heat-insulated chamber, a gas conduit in the lower portion of the latter, a plurality of spaced-apart, relatively narrow gas ducts having their major transverse axis disposed in parallel vertical planes within the chamber and longitudinally thereof, an end of each of said ducts being connected with the said gas conduit, means for introducing air into the chamber below the gas conduit and for distributing the air uniformly around each of the gas ducts, means for controlling the flow of gas through the gas conduit, and independent means for controlling the flow of air into the chamber, each of the said gas ducts having at its upper outlet end a ratio of cross-sectional perimeter to cross-sectional area of between 1½ and 5.

26. The method of making carbon black comprising, establishing a plurality of closely spaced parallel non-turbulent flowing streams of hydrocarbon gas in a combustion chamber, establishing and maintaining a thin luminous flame front around each of the said gas streams by inclosing each of the said gas streams in a uni-directional air stream having a velocity approximately equal to that of the gas stream and thereby effecting diffusion flame combustion of a part of the said gas, directly transferring a large part of the heat thus liberated from said flames by radiation to the bodies of the gas streams behind the flame fronts and thereby effecting thermal decomposition of a large proportion of the said gas, and preventing the combustion and deterioration of any substantial amount of the free carbon thus formed by rapid removal and cooling of the carbon out of contact with oxygen.

27. Apparatus for the production of carbon black comprising a furnace chamber, a gas burner mounted at one end of the said chamber and conforming closely in contour with the surrounding walls of the said chamber adjacent said burner, said burner comprising a plurality of substantially uniformly spaced gas supply ducts with appended burner tips and air supply ducts disposed around said supply ducts in the interstitial spaces separating the individual gas supply ducts, a predetermined ratio being maintained between the total cross-sectional area of the gas supply ducts and the total air duct ratio at the fluid delivery end of the burner.

28. Apparatus for the production of carbon black comprising an elongated furnace chamber, a fluid header within the chamber, a plurality of spaced flattened fluid-delivery ducts within the chamber, each having one end thereof connected with the said header and each disposed in parallel with respect to the other ducts and longitudinally of but spaced from the walls of the chamber, each of the ducts being uniform in one cross-sectional dimension throughout their length but being gradually enlarged in another cross-sectional dimension in the direction away from the end connected with the header, means for flowing air into the furnace chamber adjacent the said header and around and past the said ducts at a predetermined rate, a predetermined ratio being maintained between the total cross-sectional area of the ducts at the end thereof remote from the header and the total cross-sectional area of the air passageway surrounding the ducts at that point.

29. In the art of producing carbon black by the partial combustion of a hydrocarbon in a heated enclosed space, the improvement comprising, burning natural gas in a plurality of flames each elongated in one transverse direction, the said flames having their major transverse axes parallel, supplying air to said flames in amounts theoretically sufficient for the complete combustion of about 60% of the said natural gas, the relative velocities of natural gas to the air flowing into the said enclosed space being limited to ratios of between 1:2.2 and 1:.67.

30. The method of producing carbon black which comprises directing gas and air concurrently in relatively thin sheets into a common combustion chamber, partially burning the gases thereby producing carbon black and cooling and collecting the resultant carbon black and other products of combustion.

31. The method of producing carbon black which comprises directing a sheet of gas in streamline flow into a combustion chamber, directing into the combustion chamber a sheet of air in streamline relation with and along each side of the sheet of gas, subjecting the gas to partial combustion in the combustion chamber thereby producing carbon black, and subsequently cooling the resultant products and separating therefrom and collecting the carbon black.

32. The method of producing carbon black which comprises directing a sheet of gas in streamline relation into a chamber free from atmospheric disturbance, directing a sheet of air in parallel streamline relation upon each side of the sheet of gas, partially burning the gas as it meets the parallel sheets of air thereby producing carbon black, cooling the gas and collecting carbon black from the products of combustion.

33. The method of producing carbon black which comprises providing a thin sheet of carbonaceous gas flowing in uniform streamline relation, directing a thin sheet of air flowing in uniform streamline relation upon each side of the gas sheet, simultaneously directing the gas and air sheets between parallel walls while subjecting the gas to partial combustion thereby producing carbon black, the velocities of the gas and air being such as to avoid the development of turbulence, cooling the gas and separating therefrom the carbon black produced.

34. The method of producing carbon black which comprises establishing vertical streamline flow of relatively thin sheets of gas, directing sheets of air flowing in vertical streamline relation upon each side of each sheet of gas, partially burning the gas while maintaining the gas and air free from atmospheric disturbance, cooling the gas and subsequently directing the cooled gas into collecting receptacles adapted to separate carbon black from the cooled gas.

35. Apparatus for the production of carbon black by partial combustion of hydrocarbons, comprising a furnace having therein a burner unit composed of a plurality of spaced burners, the said burners being relatively narrow in transverse cross-section and disposed within the furnace so as to have their major cross-sectional axes parallel, narrow air ducts surrounding the respective burners, the total cross-sectional area of the burners being substantially less than the total transverse cross-sectional area of the said air ducts, each of the burners being provided with a removable burner tip of heat-resistant metal.

36. A method of producing carbon black which comprises directing gas and air concurrently in relatively thin distinct and substantially parallel sheets flowing in stream-lines into a combustion chamber, partially burning the gases and collecting the products of combustion.

37. A method of producing carbon black which comprises providing a thin film of carbonaceous gas flowing in uniform stream-line relation, directing a thin film of air flowing in uniform parallel stream-line relation upon each side of the gas film, directing the gas and air films together between parallel walls while subjecting the gas to partial combustion, the velocity of the gas and air being less than that required to produce turbulence, cooling the products of combustion and segregating the carbon black therein contained.

38. The method of producing carbon black which comprises directing a relatively thin sheet of carbonaceous gas within a heated enclosed space, concurrently directing a thin sheet of air surrounding the gas sheet within the said space, the respective sheets of gas and air flowing in stream line parallel streams within the said space at velocities below that required to produce turbulence, partially burning the gas thereby producing the said carbon black, and collecting the latter.

39. Apparatus for the production of carbon black by the partial combustion of hydrocarbons, comprising a furnace having therein a burner unit composed of a plurality of spaced elongated burners, the said burners being relatively narrow in transverse cross-section and disposed within the furnace so as to have their major cross-sectional axes parallel, narrow air ducts surrounding the respective burners, and means for independently controlling the rate of fluid flow respectively through the burners and the air ducts.

40. Apparatus for producing carbon black comprising a heating chamber, gas conduits within the said chamber and having elongated burner slots formed therein in such manner as to cause gas emitted therefrom to be ejected in substantially parallel sheets, means for flowing thin streams of air about the burner slots in parallel relation with respect to the flow of gas, and means for independently regulating the rates of flow of the gas and the air to reduce turbulence in the flowing streams to a minimum.

In testimony whereof I affix my signature.

DAVID J. BEAVER.